July 14, 1959 J. V. FRANCK ET AL 2,895,053
MEASURING PROJECTOR
Filed May 27, 1958
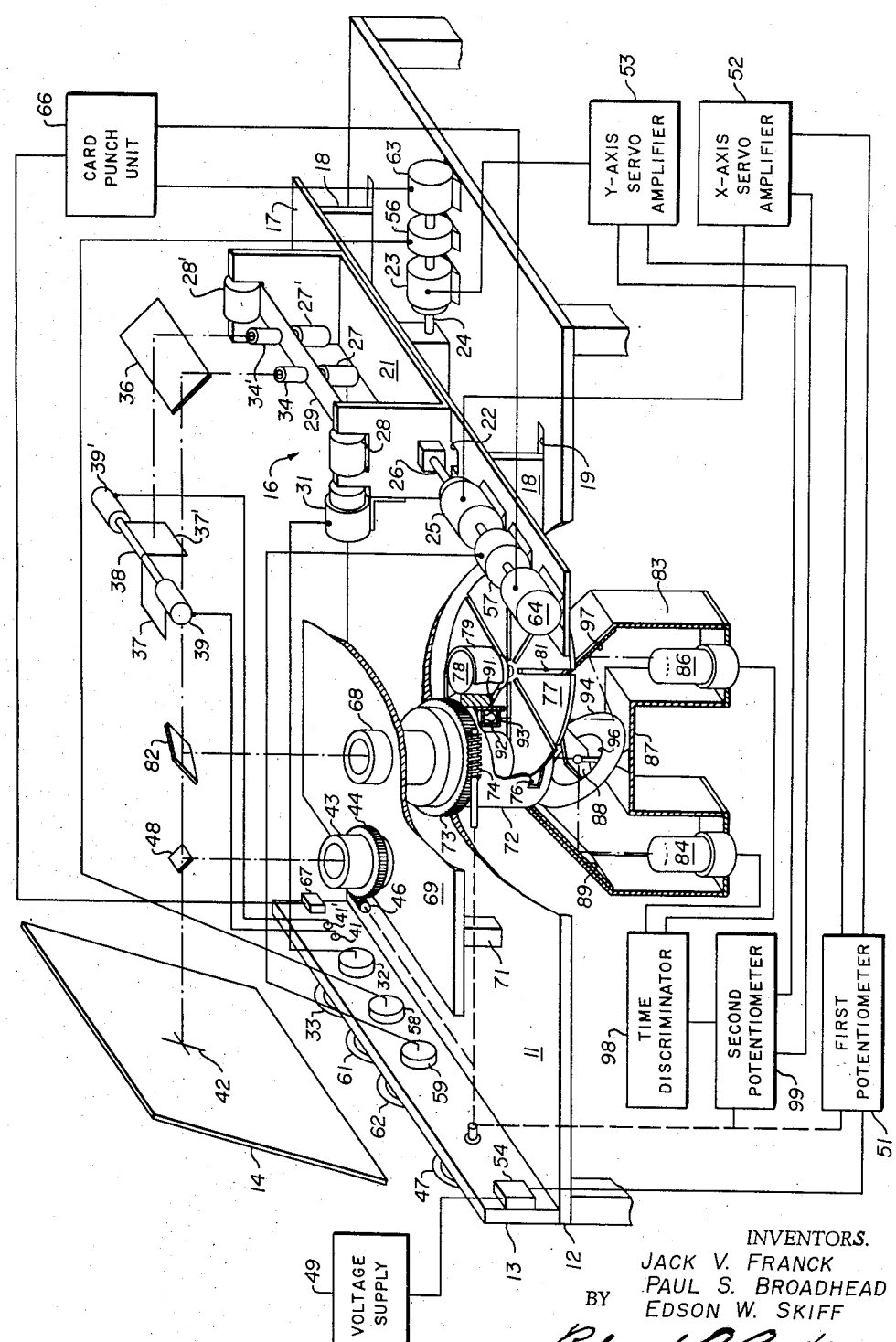
INVENTORS.
JACK V. FRANCK
PAUL S. BROADHEAD
EDSON W. SKIFF
BY
Roland A. Anderson
ATTORNEY.

United States Patent Office 2,895,053
Patented July 14, 1959

2,895,053
MEASURING PROJECTOR

Jack V. Franck and Paul S. Broadhead, Lafayette, and Edson W. Skiff, Pleasant Hill, Calif., assignors to the United States of America as represented by the United States Atomic Energy Commission Application May 27, 1958, Serial No. 738,244

14 Claims. (Cl. 250—202)

The present invention relates to means for the precise and rapid measurement of the coordinates of a line or curve, and more specifically to a semiautomatic apparatus particularly adapted for measuring the paths or tracks of ionizing radiations in a bubble chamber, cloud chamber, or the like, as recorded on photographic film. The apparatus was designed to facilitate the analysis of experimental data in the field of nuclear physics by providing a semiautomatic means of rapidly measuring and recording photographed data on particle interactions which measuring operations have heretofore required much tedious and time consuming labor. The invention will be shown, however, to have other application in diverse fields in which rapid and precise measurement of curves must be made.

One of the more useful charged-particle detector devices in the nuclear energy art is the bubble chamber, which device is described in The Review of Scientific Instruments, vol. 26, No. 10, October 1955, "Liquid Hydrogen Bubble Chambers," by Douglas Parmentier, Jr., and Arnold J. Schwemin. This form of detector has resulted in the production of multitudinous photographs of particle tracks in a superheated liquid and photographs of a similar nature are also produced by particle detectors of the cloud chamber class. Each such photograph has heretofore required many hours of careful study and accurate plotting of the co-ordinates of particle tracks in order that computations of particle mass, velocity, etc., may be made. In a ten inch hydrogen bubble chamber, for example, 9,600 photographs per eight hour period have been produced. As pointed out, however, the task of plotting track co-ordinates by conventional methods is a tedious and slow procedure. As a result, data processing lags far behind track production. This lag is being further increased by the construction of advanced bubble chambers and improved photographic equipment which are capable of detecting nuclear data at an even faster rate than before. Recent high energy particle accelerators, in conjunction with the specified advanced detection means, are capable of producing data at a much greater rate than the data can be analyzed by conventional methods, except by the employment of an inordinate number of skilled personnel. Thus, if the maximum benefit is to be obtained from such accelerators, some means of automating the track measurement process must be devised.

The photographs which are to be analyzed are generally made in stereoscopic pairs to provide information in all three dimensions, the two photographs being analyzed separately and to co-ordinate data from each being combined in later computations to provide third dimensional data. To obtain the co-ordinate data, by means of the present invention, a photograph is projected on to a screen where a centrally located reference crosshair image is superimposed on the projected picture. In the present invention, X and Y axis servo motors physically move the film holder so that a particle track may be brought into register with the crosshair. As the servo motors operate to move the film holder, attached X and Y position digital encoders provide an output signal indicative of the X and Y co-ordinates of a particular point on a particle track then in register with the crosshair. The co-ordinates of several points along an individual particle track are obtained in a similar manner, the data being automatically recorded on punched cards for subsequent analysis by a digital computer.

To decrease the time required to obtain such data, a novel scanning system automatically centers a particle track under the crosshair, thereby greatly reducing the amount of centering control manipulation required of the operator, and increasing the accuracy of such centering over a manual operation. A portion of the image from the area under the crosshair is separately projected and the image portion is scanned by a rotating disc with transparent radial slits. As an individual slit scans the image, light from the image passes through the slits and falls on the sensitive surface of a phototube. Since the particle track image is dark and transmits little light, the output current from the phototube decreases and forms a pulse when a slit scans across a track. A second phototube is disposed whereby it receives an indexing light impulse from a separate light source at the instant the scanning slit passes across the center of the image, corresponding electronically to the position of the crosshair. From a time comparison of the pulses from the two phototubes a corrective signal is derived which controls the X and Y axes servo motors to precisely center the particle track under the crosshair.

It is therefore an object of this invention to provide an improved means for the measurement of lines or curves.

It is another object of this invention to provide an improved means for the measurement of charged particle tracks on photographic film.

It is an object of this invention to facilitate the analysis of experimental data in the field of nuclear physics.

It is an object of the invention to provide an increased degree of automation in the process of nuclear track scanning whereby such operation may be carried out at a much more rapid rate than has heretofore been feasible.

It is a further object of the present invention to provide apparatus for the measurement of charged-particle tracks on photographic film which apparatus automatically centers a particle track on a reference mark to effect rapid and accurate measurement of the track.

Still a further object of this invention is to provide an improved means for automatically recording the co-ordinates of points along a charged-particle track on a photographic film whereby the identification of particles and the study of nuclear phenomena is greatly facilitated.

The invention, both as to its organization and method of operation, together with further objects and advantages thereof, will be best understood by reference to the following specification taken in conjunction with the accompanying drawing which shows the salient features of the invention in semi-schematic form.

Referring now to the drawing, there is shown a level table 11 on which the additional apparatus to be described is supported. Disposed along one edge 12 of the table 11 is a control panel 13 and a rectangular ground glass viewing screen 14 is positioned immediately thereabove, the screen being tilted slightly off vertical for better visibility by an operator. Situated at an opposite end of the table 11 from screen 14 is a movable stage assembly 16, the stage being adapted to translate an image projector along each of two perpendicular axes lying in a plane parallel to that of the table top. To accomplish the foregoing translations, the stage assembly 16 is provided with a lower platform 17 supported by spaced apart runners 18, which runners ride in ways 19 aligned perpendicular to the screen 14, the lower platform and the motion thereof being hereinafter designated the Y-axis traverse. To traverse along the X-axis, that is at right angles to ways 19 and in a plane parallel to the table top, an upper platform 21 is slidably disposed on the lower platform 17 and is guided by an appropriately aligned way 22 thereon. Motion of the lower platform 17 is controlled by a servo motor 23 mounted on table 11 and driving a lead screw 24 which engages the platform. Similarly a second servo motor 25 is mounted on the lower platform 17 and drives a lead screw 26 engaging the upper platform.

Disposed above the upper platform 21 are two spaced apart identical light sources 27 and 27' each directing a focussed light beam upward. Secured to the platform 21, above the light sources, and spaced on either side thereof, are two film spools 28 and 28' between which is wound a film strip 29 containing photographs of the charged particle tracks which are to be studied. The spools 28 and film 29 are so positioned that the film rides above the upper surfaces of the light sources 27 and 27', the sources acting to project two light beams upward through two adjacent photographs on the film. The two adjacent photographs will normally constitute a pair of stereoscopic views of the same particle tracks and obviously the spacing of the light sources 27 and 27' should be the same as the spacing of the photographs on the film. To control motion of the film spools 28, for the purposes of advancing a new pair of track photographs over the light sources, a selsyn motor 31 is coupled to the film takeup spool, the selsyn being controlled by a transmitting selsyn 32 which transmitting selsyn is situated on control panel 13 and which is provided with a handcrank 33. In fixed position immediately above the film 29 are two projecting lens assemblies 34 and 34', in optical alignment with the light sources 27 and 27', which project images of the photographs upward.

The two sets of light sources and associated projecting lenses are arranged so that the optical center lines of the two sets converge slightly, the amount of such convergence being determined by the requirement that the images from each projection set converge together on the screen 14.

To direct the images onto the viewing screen 14, a plane mirror 36 is disposed above the projection lenses 34, the mirror being inclined in order to turn the light beams from the lenses in the direction of the screen. Since it will generally be preferable that only one image appear on the screen 14 at a time, two side by side pivoting opaque vanes 37 and 37' are positioned between the mirror 36 and screen 14, the vanes being separately pivotable on a transverse shaft 38 so that either of the two images may be blocked. Each such vane 37 and 37' is rotated by a solenoid 39 and 39' which solenoids are controlled by the operator by means of switches 41 and 41' on the control panel 13.

To provide a fixed reference point on the screen 14, to enable the operator to visually center a particle track which is to be measured, a crosshair 42 is provided on the screen. In order that the crosshair be rotatable, for reasons which will hereinafter be discussed, the crosshair is preferably projected on the screen, a projection system being disposed in a vertical cylinder 43 mounted on the table 11. The cylinder is mounted to rotate about its axis and to effect such rotation a rack gear 44 is mounted coaxially on the cylinder, such rack gear coacting with a worm gear 46 driven by a handcrank 47 on the control panel 13. Since the crosshair image from cylinder 43 is projected upward, a small half silvered mirror 48 is disposed above the cylinder and inclined at an angle so that the crosshair image is projected on the center of screen 14.

It should be observed that the elements of the invention as so far described provide a mechanism by which the length, curvature, and position of the particle tracks in the film 29 may be measured, provided the operator manually controls the apparatus. By suitable translation of the movable stage 16, the image of the film on screen 14 may be shifted until the crosshair 42 coincides with the starting point of a track. The stage may then be continually translated, by suitable control of the X-axis and Y-axis servo motors 25 and 23, so that the image on the screen moves in such a manner that the crosshair effectively traces along the track. If a periodic recording of the position of the upper and lower platforms 21 and 17 of stage 16 is made, such information will effectively provide a series of coordinates of points on the track from which the desired information can be computed.

While further components of the invention are provided to carry out certain of the described operations in an automatic fashion, the invention is constructed so that the described manual operation may be performed if desired. It will contribute to an understanding of the invention to first consider such manual operation together with certain further components of the invention by which manual operation is carried out.

To drive the stage 16 in a desired direction, for the purpose of following along a track, control voltage for the servo motors 23 and 25 is supplied from a source 49. Since the desired travel of the stage 16 will generally not coincide with either of the two axes of the stage, the energizing voltage must be divided between the two servo motors 23 and 25 in proportion to the angle the track makes with the axes. To accomplish this division a sine and cosine potentiometer 51 is connected between the source 49 and the servo amplifiers 52 and 53 which amplifiers connect with the X-axis motor 25 and Y-axis motor 23 respectively. The voltage applied to the potentiometer 51 from source 49 is divided into two components respectively proportional to the sine and cosine of the angle between the track in the image and the X-axis thereof. The sine component from the potentiometer 51 is applied to the Y-axis amplifier 53 and the cosine component is applied to the X-axis amplifier 52. Hence the two servo motors drive the stage 16 in a direction determined by the setting of potentiometer 51. The setting of the potentiometer 51 is itself controlled by the crosshair rotating handcrank 47. Thus, irrespective of the curvature of the particle track, the setting of the potentiometer 51 is automatically corrected as long as the operator manipulates handcrank 47 to maintain one axis of the crosshair tangent to the track. The operator may thus effectively steer the crosshair along the track. To start and stop the servo motors, a switch 54 is disposed on control panel 13 and connected between the source 49 and potentiometer 51. Such switch preferably includes a variable resistance in order that the speed of stage translation may be regulated. The above described elements provide a mechanism for following along a selected particle track. It is desirable, however, that a further manual control be provided for directly traversing the stage 16 along either axis in order that the crosshair 42 may be initially brought to the commencement of a selected track and for the further purpose of traversing the image in any selected direction. In many instances, less than the entire area of film 29 will be visible on screen 14 and a rapid means of translating a desired portion of the image onto the screen is needed. Accordingly, the shaft of servo motor 23 connects with a receiving selsyn 56 mounted on table 11 and the shaft of servo motor 25 connects with a second receiving selsyn 57 mounted on lower stage platform 17. Each such receiving selsyn 56 and 57 is controlled by a separate transmitting selsyn, 58 and 59 respectively, situated on the control panel 13. Handcranks 61 and 62 are secured to transmitting selsyns 58 and 59 respectively to facilitate manipulation thereof.

To provide a record of coordinates along the length of the track, the position of both upper platform 21 and lower platform 17 is recorded at intervals selected by the operator. To accomplish the foregoing, a first digitizer 63 is mechanically coupled to the Y-axis lead screw 24 and a second digitizer 64 is coupled to the X-axis lead screw 26. Each such digitizer constitutes a mechanism for precisely registering rotation of a shaft by producing electrical signals in proportion to such rotation, several varieties of such apparatus being well known in the art. The signals from the digitizers 63 and 64 may be conveniently recorded by means of a card punch unit 66, a switch 67 on control panel 13 being provided in order that the operator may actuate the punch mechanism at such times as coordinates of the track are to be recorded.

The invention as described to this point provides a mechanism whereby the desired coordinates of the particle tracks appearing on film 29 can be measured and recorded. It will be observed, however, that the system as so far described requires that the operator carefully steer the tracks along the crosshair 42 on the screen. This requires an extreme degree of skill and concentration on the part of the operator if the resulting measurements are to be accurate. Moreover, considerable time is required. Accordingly the invention includes further means whereby the track is automatically maintained on the crosshair irrespective of any moderate curvature of the track. Such mechanism provides for much more rapid operation and is far more accurate, the accuracy of an existing embodiment of the invention being better than plus or minus five microns. Such automatic centering, moreover, allows the operator to direct more attention to other portions of the apparatus rather than requiring a continual concentration on the screen.

The automatic centering means comprises a scanning system producing an electrical pulse as it scans through a point corresponding to crosshair 42, that is through the center of the screen 14. The scanning system also produces an electrical pulse as it scans across the track being measured. Any time interval elapsing between the two pulses indicates a deviation of the track from the crosshair and an appropriate correction voltage is automatically applied to the servo motors 23 and 25 which drive the stage 16.

Means for accomplishing the foregoing includes a vertically aligned hollow cylinder 68 transpierced through an opening in a shelf 69, which shelf is positioned above table 11 by supports 71. The cylinder 68 is secured to the shelf at the point of intersection therewith and is positioned to be directly beneath the optical axis running from the center of mirror 36 to the crosshair 42 on screen 14. Mounted coaxially on the lower portion of cylinder 68 is a second larger hollow cylinder 72, the second cylinder being rotatable with respect to the first. To effect rotation of the second cylinder, a rack gear 73 is mounted coaxially thereon, which rack gear engages a worm gear 74. For reasons which will hereinafter be clarified, the worm gear 74 is mechanically coupled to the previously described crosshair turning handcrank 47. Thus the crosshair 42, the potentiometer 51, and the cylinder 72 all turn in synchronism upon rotation of the handcrank.

The lower portion of the lower cylinder 72 is provided with a transverse slot 76 which slot extends a large proportion of the way through the cylinder. Extending within the slot 76 is a rotary scanning disc 77, which disc is disposed transversely with respect to the longitudinal axis of the cylinder and which is offset therefrom. The disc 77 is coaxially secured to the shaft of a driving motor 78, which motor is secured to the lower cylinder 68 by a suitable mounting 79, the motor and thus the center of the disc being displaced to one side of the axis of the cylinder. The disc 77 is provided with a series of equiangularly spaced radially aligned slits 81.

The function of disc 77 is to systematically scan the central portion of the image on screen 14. To direct this portion of the image to the disc, along the axis of the cylinders 68 and 72, an inclined mirror 82 is disposed directly above the cylinders in line with mirror 36 and the crosshair 42 on screen 14. Mirror 82 is partially silvered so that a portion of the light from projectors 34 is reflected downward to the disc 77 while the remainder continues to the screen 14 to form an image thereon. Certain considerations with respect to the spacing of the foregoing elements should be considered. As has been pointed out, the two image projection lenses 34 converge slightly in order that the two images come together and are centered at the screen 14. Thus in order that the central region of either image be directed to the scanning disc 77 by the inclined mirror 82, the distance from the mirror to the disc must equal the distance from the mirror to the screen. This is readily achieved by appropriate dimensioning and spacing of the elements involved.

For purposes of determining a correction signal for the servo motors controlling the stage 16, it is necessary that an electrical pulse be produced at such time as a slit 81 of scanning disc 77 sweeps across the portion of the image containing the particle track. It is further necessary that a second pulse be produced at such time as the slit sweeps across the point in the image occupied by the crosshair 42 on the screen 14 inasmuch as the time interval between the two pulses is then a measure of the deviation of the track from the crosshair. Means for producing such pulses include a light tight box 83 secured to the lower extremity of rotatable cylinder 72 and opening into the central light passage thereof. A first and second photomultiplier tube 84 and 86 respectively are disposed within the lower portion of the box 83, the tubes being spaced apart and mounted with the photosensitive surfaces thereof facing upwards. To prevent light from one phototube from reaching the other, the lower wall 87 of the box 83 is arched upward between the tubes to form an optical barrier. An inclined mirror 88 is disposed within the upper portion of box 83 directly beneath the rotatable cylinder 72 and on the axis thereof, the mirror being inclined forty five degrees to direct light, passing through the cylinder and through a slit 81 of disc 77, in a horizontal direction. A second inclined mirror 89 is disposed against the wall of box 83, directly above first phototube 84, to redirect the light downward onto the photosensitive surface of the tube. Thus while a given slit 81 sweeps across the central passage of cylinder 72, light is received by the first phototube 84 which tube will deliver a substantially constant voltage signal. As the slit 81 sweeps into alignment with a particle track, the light to the phototube is momentarily blocked which decrease in the light gives rise to a pulse indicative of the passage of the slit across the track.

For purposes of determining the error in the position of the track, it is necessary to provide means for producing a second pulse at the moment the slit sweeps across the axis of cylinder 72, which axis corresponds to the position of the crosshair 42 on screen 14. While a variety of means are adaptable to this purpose, the elements here shown include a small light bulb 91 disposed in a recess 92 in the wall of cylinder 72, the recess being immediately above the scanning disc slot 76 and being provided with a single small opening 93 directly above the disc. In order that the passage of light from bulb 91 through a slit 81 coincide exactly with the passage of the slit across the axis of cylinder 72, the opening 93 must lie in the plane defined by the axis of the cylinder and the rotary axis of the disc 77.

To direct light from bulb 91, which light has passed through a slit 81, to the second photomultiplier tube 86, a further mirror 94 is disposed within the upper portion of box 83, the mirror 94 being perpendicular to the mirror 88 and being provided with a central oval cutout portion 96 through which the mirror 88 is transpierced. The cutout portion must have a horizontal projection of radius slightly less than the displacement of light opening 93 from the axis of cylinder 72 so that the light passing directly downward from the opening 93 will strike the surface of the mirror 94 irrespective of the rotational placement of the cylinder 72. Light striking the mirror 94 is directed downward onto the surface of second phototube 86 by means of still another mirror 97 disposed against the wall of box 83 in parallelism with mirror 94. Thus the second phototube 86 receives a light pulse, and produces an output pulse, each time a slit 81 sweeps across the axis of cylinder 72.

Considering now means for comparing the two signals from phototubes 84 and 86 and for applying an appropriate correction voltage to the stage controlling servo motors 23 and 25, there is shown a time discriminator circuit 98 having two inputs each one connected with an individual one of the phototubes 84 and 86. The discriminator 98, which may be of conventional design, is of the class producing a D.C. output voltage proportional to the time interval elapsing between the two input signals, the polarity of the output indicating whether the track pulse precedes or follows the reference pulse.

The output voltage of discriminator 98 is applied to the input of a second sine and cosine potentiometer 99, the setting of which is mechanically controlled by the previously described crosshair rotating handcrank 47 on control panel 13. Potentiometer 99 acts to divide the voltage into two components respectively proportional to the sine of the angle the particle track makes with the X-axis of stage 16 and to the cosine thereof. The first or sine component is applied to the input of X-axis servo amplifier 52 and the second or cosine component is applied to the Y-axis servo amplifier 53. Inasmuch as these amplifiers supply the servo motors 23 and 25, the motors traverse the stage 16 to correct for lateral deviation as detected by the discriminator circuit 98.

Using the automatic centering control as described above, the operator need not exert as precise a control over the steering handwheel 47 to obtain accurate results. Provided the deviation of the track on screen 14 from the center of crosshair 42 does not exceed certain limits, such deviation is automatically corrected and the track is returned to the crosshair through the mechanism described above. The operator must, however, operate the steering handcrank 47 to the extent that the crosshair is maintained approximately tangent to the track on the screen. To the extent that the crosshair is not tangent, the restoring motion of the track image is not directly towards the crosshair but occurs at an oblique angle such that the crosshair returns to the track a distance along the track from the point of departure and the coordinates of intervening points cannot be accurately recorded. Since in most circumstances the curvature of the track is slight relative to the speed of travel along the track, the requirement that the operator manipulate the handcrank 47 to maintain tangency does not impose an exacting burden and the operator is relatively free to pay attention to other aspects of controlling the apparatus. The speed and accuracy of track following using the automatic centering is far greater than can be obtained by manual steering. It should be understood that should the deviation of the track from the crosshair exceed, for one reason or another, the limits within which automatic correction occurs, the operator may resort to manual traversing of the image through handcranks 61 and 62 as previously described in order to bring the track back into register. Moreover in a region of the image where various tracks are so closely spaced that the scanning system delivers unwanted pulses to the discriminator circuit 98, the operator can at any time resort to temporary manual control by means of the handcranks.

Considering now the general mode of operation of the invention, a particular particle track to be plotted is selected by visual inspection of the image on screen 14. Utilizing handcranks 61 and 62, the operator causes the X and Y axis selsyn motors 57 and 56 to traverse the stage mechanism and bring one extremity of the selected track image under the crosshair 42. The steering handcrank 47 is turned so that the crosshair, and thus the slits 81 in the scanning disc 77, is aligned parallel with the track. The output from the time discriminator 98 supplies a correction signal which causes the servomotors 23 and 25 to exactly center the track image under the crosshair 42. The operator then actuates the card punch unit 66, which records the initial coordinates of the track in terms of the position of the stage 16. Since several points along a particular track generally need to be recorded, switch 54 is closed applying a signal through the first potentiometer 51 which causes the servo motors to move the stage so that the track image moves along the crosshair. Simultaneous with the progression of the track image along the crosshair, the scanning system provides a lateral correction for any deviation which may occur due to curvature of the track or other causes. At selected intervals along the track, the operator actuates switch 67 to cause the card punch unit to record coordinates. As the track progresses under the crosshair 42, the operator need only rotate the crosshair, by means of handcrank 47, to maintain the crosshair approximately tangent to the track.

It will be apparent that various alternate arrangements of the components of the invention are possible, the placement of the screen 14 and control panel 13 relative to the stage assembly 16, for example, being a matter of convenience. Variations in the detailed structure of the scanning system will also suggest themselves. The indexing light 91 and second phototube 86 might be replaced with a series of electrical contacts on the periphery of scanning disc 77. The scanning disc 77 may be replaced with a vibrating element containing a single slit. The card punch unit 66 may be replaced with other data storage means, magnetic tapes being one example. Thus various rearrangements of the elements of the invention are possible, as well as various substitutions of equivalent elements, and the particular structure described herein should be considered as but one example of a workable arrangement.

The embodiment of the invention herein disclosed was particularly designed to facilitate the measurement of visible tracks left by ionizing radiation traversing certain forms of detector. It should be observed, however, that the invention has diverse application in other fields. The apparatus is useful, for example, in precisely measuring the position and trajectory of stars in astronomical photographs. Other application, such as the measurement of isobars and isotherms on weather maps, are contemplated. It should be understood therefore that the word curve as used herein and in the appended claims is intended to include any data existing in the form of an extended trace on a surface and includes a straight line as a specialized form of curve.

Thus while the invention has been disclosed with respect to a single preferred embodiment, it will be apparent to those skilled in the art that numerous variations and modifications may be made within the spirit and scope of the invention and it is not intended to limit the invention except as defined in the following claims.

What is claimed is:

1. In apparatus for determining the coordinates of a curve, the combination comprising means forming an image which image contains said curve, a scanning element systematically sweeping across at least a portion of said image, said scanning element being generally opaque and having at least one relatively small light transmitting area, means for producing measured relative motion between said image and said scanning element whereby a fixed reference point in the region swept by said scanning element may be caused to trace along said curve, a photosensitive element positioned to receive only light from said image transmitted through said light transmitting area of said scanning element thereby producing a signal indicative of the passage of said area across the region of said image occupied by said curve, means producing a second signal as said light transmitting area of said scanning element sweeps across said fixed reference point, a discriminator circuit detecting the time interval between said first and second signals as a measure of the deviation of said curve from said fixed reference point and producing an output signal indicative of said deviation, and servo means operating in response to said output signal of said discriminator, said servo means acting to produce relative motion between said image forming means and said scanning element to restore said curve to said fixed reference point.

2. Apparatus for measuring the coordinates of a curve comprising, in combination, a movable stage translatable along either of two perpendicular axes, servo motor means controlling said translation of said stage, means energizing said servo motor means to translate said stage in a predetermined direction, means disposed on said stage for forming an image containing said curve, a scanning element having a substantial opaque area and having at least one light transmitting slit, means sweeping said scanning element and said slit thereof across said image with a motion transverse to the direction of said curve therein, a photosensitive element receiving light transmitted through said slit of said scanning element whereby a first signal is produced corresponding to the passage of said slit across the portion of said image occupied by said curve, means producing a second signal corresponding to the passage of said slit across a fixed reference point in the region of said image, a time discriminator circuit receiving said first and second signals and producing a third signal proportional to the time interval between sad first and second signals, said third signal constituting a measure of the deviation of said curve from said fixed reference point, means driving said servo motors in response to said third signal to restore said curve to said fixed reference point, and means for periodically recording the position of said stage as a measure of the coordinates of said curve.

3. In a measuring apparatus for precisely determining the coordinates of a curve, the combination comprising a stage platform adapted to be traversed along either of two perpendicular axes, servo motor means coupled to controllably translate said stage platform in any selected direction in the plane defined by said axes, means energizing said servo motor means to traverse said stage platform in said selected direction, an image projector for projecting an image containing said curve to be measured which image traverses with said stage platform, a scanning element positioned to scan at least a portion of said projected image containing said curve, said scanning element being generally opaque and having at least one relatively small light transmitting area which light transmitting area is systematically swept across said portion of said projected image, a photosensitive device positioned to receive only light transmitted through said light transmitting area of said scanning element thereby producing a first pulse as said light transmitting area sweeps across a portion of said projected image occupied by said curve, means producing a second pulse at the time of passage of said light transmitting area of said scanning element across a fixed reference point in the region of said projected image, a time discriminator circuit detecting the time interval between said first and second pulses and producing an output signal indicative of said time interval which output signal constitutes a measure of the deviation of said curve from said fixed reference point in the region of said image, means energizing said servo motor means in response to said signal to traverse said stage whereby said image is translated to bring said curve into register with said fixed reference point, and means recording the movement of said stage as a measure of the coordinates of said curve.

4. In a measuring apparatus for precisely determining the coordinates of a curve substantially as described in claim 3, the further combination of a fixed screen spaced apart from said projector and positioned to receive said image therefrom, the portion of said screen corresponding to said fixed reference point being visibly marked whereby an operator may readily observe the progress of said curve through said fixed reference point.

5. A measuring apparatus for precisely determining the coordinates of a curve substantially as described in claim 3 wherein said scanning element comprises a rotating disc, said light transmitting area of said dics comprising a radially aligned slit therein.

6. A measuring apparatus for precisely determining the coordinates of a curve, substantially as described in claim 3, wherein said curve is contained within an image on a photographic film, said film being mounted on said stage platform and adapted to move therewith, said image projector receiving said film and being fixed in position whereby said film moves through said projector in response to movement of said stage plateform.

7. Apparatus for measuring the coordinates of a curve comprising, in combination, a movable stage translatable along each of two perpendicular axes, servo motor positioning means controlling said translation of said stage, means energizing said servo motor means to translate said stage in a selected direction, image projection means for projecting an image containing said curve, said projection means being linked with said stage whereby said image moves in synchronism therewith, a scanning element having a substantial opaque area and having at least one light transmitting slit, a motor sweeping said scanning element and said slit thereof across at least a portion of said projected image, means for selectively rotating the direction of sweep of said scanning element across said image whereby said scanning element may be caused always to sweep said image in a direction transverse to said curve therein, a photosensitive element receiving light from said image as transmitted through said slit of said scanning element whereby a first signal is produced corresponding to the passage of said slit across the portion of said image occupied by said curve, means producing a second signal corresponding to the passage of said slit across a fixed reference point in the region of said image, a time discriminator circuit receiving said first and second signals and producing an output indicative af the time interval between said first and second signals, said output constituting a measure of the deviation of said curve from said fixed reference point, means driving said servo-motor means in response to said output of said discriminator to translate said image to restore said curve to said fixed reference point, and means for periodically recording the position of said stage as a measure of the coordinates of said curve.

8. A measuring projector for determining the coordinates of nuclear particle tracks as recorded on photographic film, comprising, in combination, a movable stage, servo motor means coupled to controllably translate said stage along either of two perpendicular axes, means energizing said servo motors to translate said stage in any selected direction in the plane defined by said perpendicular axes, an image projector positioned adjacent said stage and having provision for receiving said film the image of which is to be projected, means securing said film to said stage whereby said film and the projected image therefrom is translated in accordance with the motion of said stage, a scanning element having a substantial opaque area and having at least one light transmitting slit, said scanning element being positioned in said projected image in transverse relationship thereto, motor means sweeping said scanning element and said slit thereof across said projected image, means for selectively altering the direction in which said scanning element sweeps across said image whereby said slit may be caused to sweep across said curve in said image substantially in alignment with said curve, a photosensitive element positioned to receive light from said image transmitted through said slit of said scanning element thereby producing a first signal indicative of the passage of said slit across the portion of said image containing said curve, means producing a second signal corresponding to the passage of said slit across a fixed reference point in the region of said image, a time discriminator circuit receiving said first and second signals and producing an output signal proportional to the time interval therebetween, means actuating said servo motor means in response to said third signal to translate said stage and said film thereon to restore the image of said curve to said fixed reference point, and means for periodically registering the position of said stage as a measure of the coordinates of said curve.

9. A measuring projector for determining the coordinates of nuclear particle tracks as recorded on photographic film substantially as described in claim 8 wherein said scanning element comprises a rotating disc disposed transversely to said projected image, said light transmitting slit of said scanning element being substantially radially aligned on said disc, and wherein said means for altering the direction in which said scanning element sweeps across said projected image comprises a mounting for selectively pivoting said disc about an eccentric axis thereof.

10. In a measuring projector substantially as described in claim 8, the further combination of a screen positioned to receive said projected image, and a crosshair image projector projecting a fiducial crosshair mark onto said screen, which mark corresponds in position to said fixed reference point, said crosshair image projector being rotatably mounted and being coupled to rotate in synchronism with said means for altering the direction in which said scanning element sweeps across said projected image, whereby said screen enables an operator to visually observe the coincidence of said curve in said image with said fixed reference point and to more readily maintain the direction of sweep of said scanning element in alignment with said curve.

11. In a measuring projector substantially as described in claim 8, the further combination comprising manually operable means for driving said stage in any selected direction in the plane defined by said perpendicular axes.

12. In a measuring projector substantially as described in claim 8, the further combination of a second image projector positioned adjacent said stage and having provision for receiving a further portion of said film, said second image projector having an optical axis converging with that of said first image projector at a distance equal to the distance of said scanning element from said first and second image projectors measured along the optical axes thereof, whereby two stereoscopic images of the same particle track spaced apart on said film may be measured to obtain three dimensional coordinates.

13. In a measuring projector for determining and recording the precise coordinates of particle tracks as pictured on photographic film, the combination comprising a stage movable along each of two perpendicular axes, a first servo motor controlling translation of said stage along one of said axes, a second servo motor controlling translation of said stage along the other of said axes, a first potentiometer dividing a control voltage between said first and second servo motors to actuate said motors to drive said stage in a given direction in the plane defined by said axes, an image projector positioned adjacent said stage and having provision for receiving said film and projecting an image thereof, means securing said film to said stage whereby said film and the image projected therefrom is translated with said stage, a substantially opaque scanning element having at least one light transmitting slit, said scanning element being positioned to receive at least a portion of said projected image, a motor repeatedly sweeping said scanning element across said portion of said image, means for selectively changing the direction in which said scanning element sweeps across said portion of said image whereby said slit may be caused to sweep across a selected track in said image substantially in alignment with said track, a photosensitive device positioned to receive light from said image as transmitted through said slit of said scanning element thereby producing a first signal indicative of the passage of said slit across the portion of said image occupied by said track, means producing a second signal indicative of the passage of said slit across a fixed reference point in the region of said image, a time discriminator circuit receiving said first and second signals and producing an output voltage proportional to the time interval between said first and second signals, a second potentiometer dividing said output voltage between said first and second servo motors, a linkage coupling the setting of said first and second potentiometers to change in synchronism with said means for selectively changing the direction in which said scanning element sweeps across said image whereby said servo motors are caused to maintain said track in said image on said fixed reference point, a detecting element sensitive to motion of said stage and producing output signals indicative of said motion, and a data storage means receiving said output signals as a measure of the coordinates of said tracks on said film.

14. In a measuring projector for determining and recording the precise coordinates of particle tracks as pictured on photographic film, substantially as described in claim 13, the further combination of a screen positioned to receive said projected image, a second image projecting means projecting a fiducial crosshair mark onto said screen which mark corresponds in position to said fixed reference point, said second image projection means being rotatably mounted whereby said crosshair is rotatable on said screen, a rotating control element accessible to an operator viewing said screen, and linkage connecting said second image projection means and said means for selectively changing the direction in which said scanning element sweeps across said image and said first and second potentiometers for simultaneous rotation whereby said operator may maintain the proper setting of said first and second potentiometers by manually manipulating said rotating control to maintain a selected arm of said crosshair tangent to said track on said screen.

References Cited in the file of this patent

UNITED STATES PATENTS

| | | |
|---|---|---|
| 2,489,305 | McLennan | Nov. 29, 1949 |
| 2,548,590 | Cook | Apr. 10, 1951 |
| 2,610,542 | Smith | Sept. 16, 1952 |
| 2,777,354 | Stickney et al. | Jan. 15, 1957 |

OTHER REFERENCES

Phillips: The Review of Scientific Instruments; vol. 25, No. 10, October 1954 (pp. 971–976).